(12) United States Patent
Akiyama (10) Patent No.: US 8,159,163 B2
(45) Date of Patent: Apr. 17, 2012

(54) PHASE CURRENT ESTIMATION DEVICE OF MOTOR AND MAGNETIC POLE POSITION ESTIMATION DEVICE OF MOTOR

(75) Inventor: Masahiko Akiyama, Shimotsuke (JP)

(73) Assignee: Honda Motor Co., Ltd., Tokyo (JP)

( * ) Notice: Subject to any disclaimer, the term of this patent is extended or adjusted under 35 U.S.C. 154(b) by 384 days.

(21) Appl. No.: 12/626,055

(22) Filed: Nov. 25, 2009

(65) Prior Publication Data

US 2010/0127648 A1    May 27, 2010

(30) Foreign Application Priority Data

Nov. 26, 2008    (JP) .................................. 2008-300927

(51) Int. Cl.
*H02P 6/18* (2006.01)
*H02P 6/20* (2006.01)
*H02P 7/06* (2006.01)

(52) U.S. Cl. ......... 318/400.11; 318/400.04; 318/400.09; 318/254; 318/430; 318/599

(58) Field of Classification Search ............. 318/400.04, 318/400.09, 400.11, 400.36, 430, 431, 254, 318/599
See application file for complete search history.

(56) References Cited

U.S. PATENT DOCUMENTS

| | | | | |
|---|---|---|---|---|
| 7,173,393 B2 * | 2/2007 | Maeda et al. | ............ | 318/400.02 |
| 7,411,369 B2 * | 8/2008 | Maeda et al. | ................. | 318/801 |
| 7,671,557 B2 * | 3/2010 | Maeda et al. | ................. | 318/729 |
| 7,898,210 B2 * | 3/2011 | Hsieh et al. | ................... | 318/811 |
| 2004/0169488 A1 * | 9/2004 | Maeda et al. | ................. | 318/801 |
| 2005/0206341 A1 | 9/2005 | Yin Ho | | |
| 2007/0114966 A1 * | 5/2007 | Maeda et al. | ................. | 318/811 |
| 2008/0180056 A1 * | 7/2008 | Maeda et al. | ................. | 318/729 |
| 2009/0212733 A1 * | 8/2009 | Hsieh et al. | ................... | 318/729 |
| 2010/0117586 A1 * | 5/2010 | Akiyama | ...................... | 318/801 |
| 2011/0050140 A1 * | 3/2011 | Sakai et al. | ............. | 318/400.36 |

FOREIGN PATENT DOCUMENTS

| | | |
|---|---|---|
| EP | 1347567 | 9/2003 |
| EP | 1672775 | 6/2006 |
| JP | 09-233900 | 9/1997 |
| JP | 2001-251889 | 9/2001 |
| JP | 2004-048868 | 2/2004 |
| JP | 2004-254424 | 9/2004 |
| JP | 2005-012934 | 1/2005 |

* cited by examiner

*Primary Examiner* — Paul Ip (74) *Attorney, Agent, or Firm* — Rankin, Hill & Clark LLP (57) ABSTRACT

A phase current estimation device of a motor includes: an inverter which uses a pulse width modulation signal to sequentially commutate an electric flow to a motor of a three-phase alternating current; a pulse width modulation signal generation unit generating the pulse width modulation signal from a carrier signal; a control unit performing a startup control and a self control of the motor using the inverter; a direct current sensor detecting a direct current of the inverter; and a phase current estimation unit estimating a phase current based on the direct current detected by the direct current sensor.

4 Claims, 8 Drawing Sheets

PHASE CURRENT ESTIMATION DEVICE OF MOTOR AND MAGNETIC POLE POSITION ESTIMATION DEVICE OF MOTOR

BACKGROUND OF THE INVENTION

The present application claims priority on Japanese Patent Application No. 2008-300927, filed Nov. 26, 2008, the content of which is incorporated herein by reference.

FIELD OF THE INVENTION

The present invention relates to a phase current estimation device of a motor and a magnetic pole position estimation device of a motor.

DESCRIPTION OF THE RELATED ART

A conventionally known inverter device obtains a predetermined pulse width when the modulation degree is small or when the phase of the output voltage vector is close to the phase of a single basic voltage vector. This conventionally known inverter device outputs the vector components of a first basic voltage vector and a second basic voltage vector within a first time period. The first and second basic voltage vectors can create a command voltage vector. The phases of these first and second basic voltage vectors differ by sixty degrees. The first time period is equal to one PWM cycle (one time cycle of a carrier wave). In addition, the conventionally known inverter device outputs the vector components of a third basic voltage vector and a fourth basic voltage vector within a second time period. The phases of the third and fourth basic voltage vector each differ from the phases of the first and second basic voltage vector by 180 degrees. The second time period is equal to one PWM cycle that is continuous to the first time period. (Refer to, for example, Japanese Unexamined Patent Application No. 2005-12934.)

Meanwhile, another conventionally known control device computes the position angle and the rotational velocity of the rotator from the voltage equation of the motor which is under a sensor-less control. When the command voltage vector is small, this conventionally known control device augments the command voltage vector in the positive direction and the negative direction by superimposing a pulse voltage with the command voltage vector. The average value of this pulse voltage within a predetermined time period is zero. (Refer to, for example, Japanese Unexamined Patent Application No. H09-233900.)

According to the conventionally known inverter device, the command voltage vector is broken up into two vectors that are respectively in the first and second PWM cycles in order to obtain a predetermined pulse width. When the command voltage vector is broken up into two vectors in this way, a harmonic component (the difference between the command voltage vector and the vector obtained by breaking up the command voltage vector) is created, which triggers an increase in noise and torque pulsation. Thus, there is a problem in that the stability of controlling the current declines.

Further, according to the conventionally known control device, a pulse voltage is superimposed with the command voltage vector. As a result, a harmonic component occurs, triggering a decrease in the stability of controlling the current.

Moreover, according to the conventionally known inverter device and the control device, the modulation factor of the inverter decreases when the rotational velocity and the torque of the motor are small. Thus, when the phase current is estimated from the DC side current of the inverter during a sensor-less control, for example, it becomes difficult to retain a predetermined pulse width (in other words, the pulse width of the pulse width modulation) that is necessary to appropriately detect the DC side current. Furthermore, there is also a problem in that the region with a small modulation factor expands as the input voltage of the inverter increases.

Considering the problems described above, an object of the present invention is to provide a phase current estimation device of a motor that prevents an increase in noise and torque pulsation due to the creation of a harmonic component, retains a predetermined degree of stability in controlling the current, and appropriately enhances the accuracy in estimating the phase current. In addition, an object of the present invention is to provide a magnetic pole position estimation device of a motor that appropriately improves the precision with which the magnetic pole position is estimated.

SUMMARY OF THE INVENTION

In order to achieve the above object, the present invention employs the following.

(1) A phase current estimation device of a motor according to an aspect of the present invention includes: an inverter which uses a pulse width modulation signal to sequentially commutate an electric flow to a motor of a three-phase alternating current; a pulse width modulation signal generation unit generating the pulse width modulation signal from a carrier signal; a control unit performing a startup control and a self control of the motor using the inverter; a direct current sensor detecting a direct current of the inverter; and a phase current estimation unit estimating a phase current based on the direct current detected by the direct current sensor, wherein the control unit performs a feedback control while the startup control and the self control are performed, so that a first deviation between a control command value and a control detection value corresponding to the control command value equals zero, the control command value being based on a second deviation between a modulation factor of the inverter and a predetermined modulation factor lower limit value, the predetermined modulation factor lower limit value being a lower limit of a modulation factor range in which the phase current estimation unit is capable of estimating the phase current.

Based on the phase current estimation device of the motor described above in (1), a feedback control is performed so that the deviation between a control command value and a control detection value equals zero. This control command value corresponds to a deviation between the modulation of the inverter and a predetermined lower limit value of a modulation factor, which defines a range of the modulation factor in which the phase current can be estimated. In this way, it is possible to retain a predetermined pulse width (in other words, the pulse width of the pulse width modulation) that is necessary to appropriately detect the DC side current when the phase current is estimated from the DC side current of the inverter. Therefore, even when the rotational velocity of the motor is below a predetermined value and is small, the accuracy of estimating the phase current can be improved appropriately without relying on the creation of or the application of harmonic voltage. At the same time, it is possible to prevent an increase in noise and torque pulsation triggered as a result of harmonic voltage. Further, it is possible to prevent a decrease in the stability with which current is controlled.

(2) In addition, a phase current estimation device of a motor according to the aspect of the present invention may be configured as follows: the control unit sets up a γδ-coordinate system having a phase difference with respect to a dq-coordinate system, the control unit performing a feedback control of a current while the startup control is executed, so that a third deviation between a γ-axis current command value as the control command value and a γ-axis current detection value as the control detection value equals zero.

Based on the phase current estimation device of the motor described above in (2), a feedback control is performed on the current during a startup control so that the deviation between the γ-axis current command value and the γ-axis current detection value becomes zero. Thus, until the rotational velocity of the motor reaches a value such that a self control can be performed, the modulation factor of the inverter can be prevented from dropping below a predetermined lower limit of the modulation factor. In this way, it is possible to retain a predetermined pulse width (in other words, the pulse width of the pulse width modulation) that is necessary to appropriately detect the DC side current when the phase current is estimated from the DC side current of the inverter. Consequently, the phase current can be estimated with more accuracy.

(3) Furthermore, a magnetic pole position estimation device of a motor according to an aspect of the present invention includes: the phase current estimation device of the motor described above; and a rotational angle estimation unit estimating a rotational angle of the motor while the self control is executed, and outputting an estimated rotational angle signal.

Based on the magnetic pole position estimation device of the motor described above in (3), the magnetic pole position can be estimated based on an induced electromotive force. The phase current can be estimated as well.

DETAILED DESCRIPTION OF THE PREFERRED EMBODIMENTS

Hereinafter, a first embodiment of a phase current estimation device of a motor and a magnetic pole position estimation device of a motor according to an aspect of the present invention is described, with reference to FIGS. 1 to 9.

A phase current estimation device 10a of a motor (hereinafter, simply referred to as a phase current estimation device 10a) according to the above embodiment is provided in a magnetic pole position estimation device 10 of a motor (hereinafter, simply referred to as a magnetic pole position estimation device 10). The phase current estimation device 10a estimates each phase current flowing through a brushless DC motor 11 of a three-phase alternate current (hereinafter, simply referred to as a motor 11). This motor 11 includes a rotator (not diagramed) and a stator (not diagramed). The rotator includes a permanent magnet used as a magnetic field. The stator generates a rotating magnetic field that rotates this rotator. The magnetic pole position estimation device 10 estimates a magnetic pole position of the motor 11 (in other words, the rotational angle of the magnetic pole of the rotator from a predetermined standard rotational position).

Figure 1:
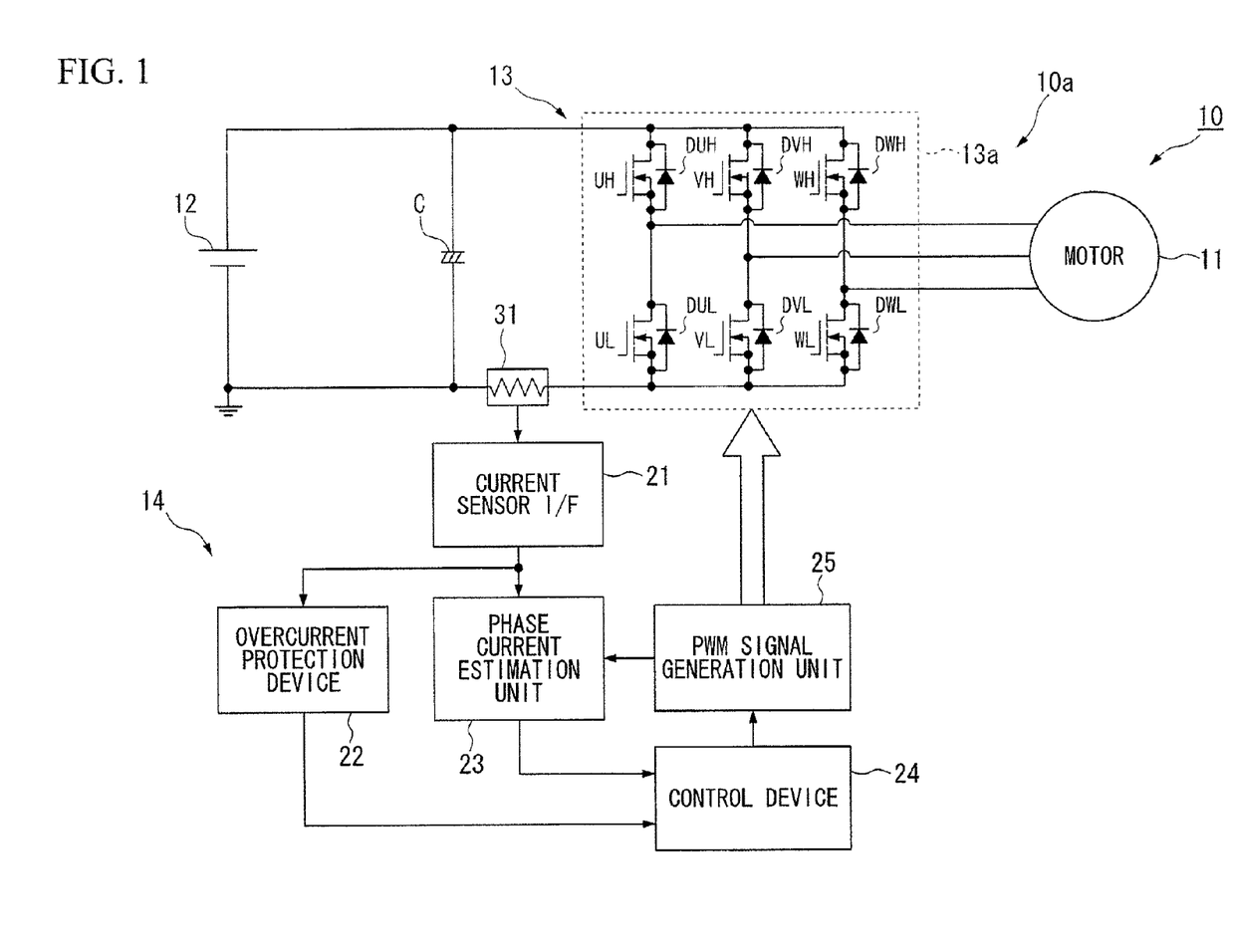
FIG. 1 is a configuration diagram of a phase current estimation device of a motor and a magnetic pole position estimation device of a motor according to an embodiment of the present invention.
Figure 2A:
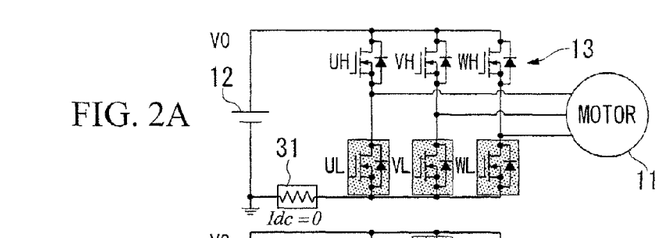
FIG. 2A is a diagram representing a switching condition S1 of an inverter represented in FIG. 1.
Figure 2B:
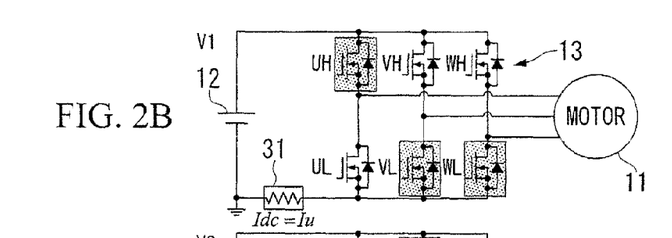
FIG. 2B is a diagram representing a switching condition S2 of an inverter represented in FIG. 1.
Figure 2C:
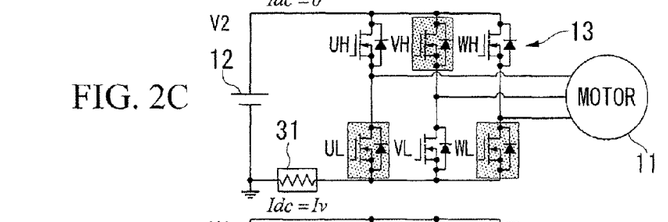
FIG. 2C is a diagram representing a switching condition S3 of an inverter represented in FIG. 1.
Figure 2D:
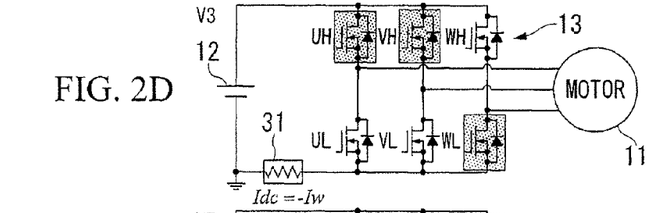
FIG. 2D is a diagram representing a switching condition S4 of an inverter represented in FIG. 1.
Figure 2E:
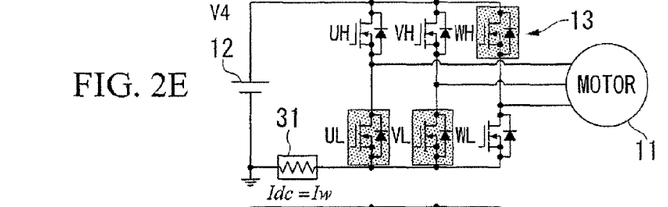
FIG. 2E is a diagram representing a switching condition S5 of an inverter represented in FIG. 1.
Figure 2F:
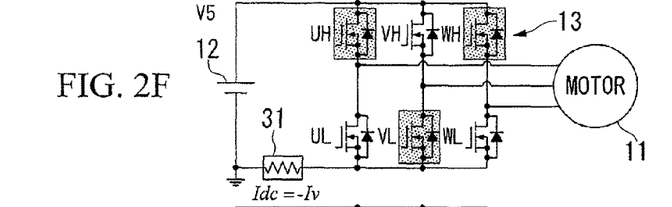
FIG. 2F is a diagram representing a switching condition S6 of an inverter represented in FIG. 1.
Figure 2G:
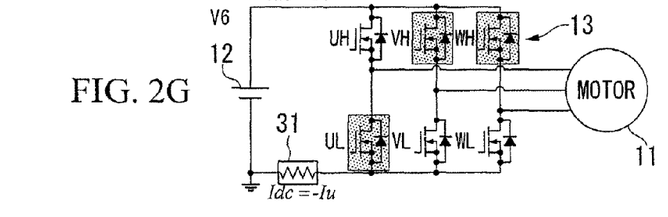
FIG. 2G is a diagram representing a switching condition S7 of an inverter represented in FIG. 1.
Figure 2H:
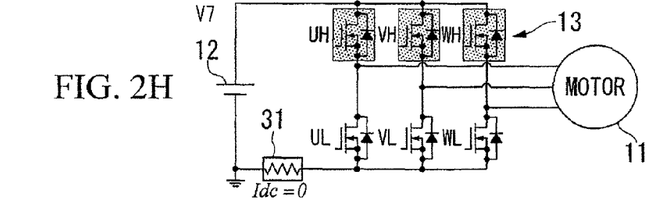
FIG. 2H is a diagram representing a switching condition S8 of an inverter represented in FIG. 1.

The phase current estimation device 10a includes an inverter 13 and a motor control device 14 as shown in FIG. 1, for example. The inverter 13 uses a battery 12 as a DC power source.

The inverter 13 drives the motor 11 of a three-phase (for example, a U-phase, a V-phase, and a W-phase) alternate current by receiving a control command outputted by the motor control device 14.

The inverter includes a bridge circuit 13a and a smoothing capacitor C. The bridge circuit 13a is formed by bridge-connecting a plurality of switching elements (for example, a MOSFET: Metal Oxide Semiconductor Field Effect Transistor). This bridge circuit 13a is driven by a signal processed with pulse width modulation (PWM).

In the bridge circuit 13a, a high-side and a low-side U-phase transistor UH and UL, a high-side and a low-side V-phase transistor VH and VL, and a high-side and a low-side W-phase transistor WH and WL, which form a pair for each of the phases, are bridge-connected. Each of the transistors UH, VH, and WH form a high side arm by a drain connected to a positive side terminal of the battery 12. Each of the transistors UL, VL, and WL form a low side arm by a source connected to a grounded negative side terminal of the battery 12. For each phase, the source of each of the transistors UH, VH, and WH of the high side arm is connected to the drain of each of the transistors UL, VL, and WL of the low side arm. Between the drain and the source of each of the transistors UH, UL, VH, VL, WH, and WL, each of the diodes DUH, DUL, DVH, DVL, DWH, and DWL are connected, so that the direction from the source to the drain is the forward direction.

The inverter 13 converts the direct-current power supplied from the battery 12 to a three-phase alternate-current power by switching over the on (conduction) and off (interruption) condition of each of the transistors forming a pair for each of the phases. The inverter 13 performs this operation based on a gate signal (in other words, a PWM signal) which is a switching command outputted by the motor control device 14 while the motor 11 is driven, for example, and inputted into the gate of each of the transistors UH, VH, WH, UL, VL, and WL. By sequentially commutating the current flow to the three-phase stator winding, a U-phase current Iu, a V-phase current Iv, and a W-phase current Iw are sent to each phase of the stator winding. The current Iu, Iv, and Iw are an alternate current.

The motor control device 14 performs a feedback control (a vector control) of the current on a γ-δ coordinate system forming a rotational orthogonal coordinate system, as described later. The motor control device 14 calculates the command γ-axis current Iγc and the command δ-axis current Iδc. The motor control device 14 also computes each of the phase voltage commands Vu, Vv, and Vw based on the command γ-axis current Iγc and the command δ-axis current Iδc. In addition, the motor control device 14 outputs a PWM signal according to each of the phase voltage commands Vu, Vv, and Vw. The PWM signal is a gate signal with respect to the inverter 13. Furthermore, the motor control device 14 executes a control so that the deviation between the command γ-axis current Iγc and the γ-axis current Iγ and the deviation between the command δ-axis current Iδc and the δ-axis current Iδ both equal zero. The γ-axis current Iγ and the δ-axis current Iδ are obtained by converting each of the phase current Iu, Iv, and Iw, which are actually supplied by the inverter 13 to the motor 11, to a γ-δ coordinate system.

As a control mode of the motor 11, the motor control device 14 switches over between a startup control and a self control. The startup control is performed, for example, when the motor 11 is started. The self control is performed by estimating a rotational angle from the change in the induced electromotive force of the motor 11, and executing a drive control of the motor 11 based on the estimated rotational angle.

The motor control device 14 includes, for example, a current sensor I/F (interface) 21, an overcurrent protective device 22, a phase current estimation unit 23, a control device 24, and a PWM signal generation unit 25.

The current sensor I/F (interface) 21 is connected to the direct current side current sensor 31 between the bridge circuit of the inverter 13 and the negative side terminal of the battery 12. The direct current side current sensor 31 detects the direct current side current Idc of the bridge circuit 13a of the inverter 13. The current sensor I/F (interface) 21 outputs the detected signal to the overcurrent protective device 22 and the phase current estimation unit 23. This detected signal is outputted by the direct current side current sensor 31.

Incidentally, the direct current side current sensor 31 may be placed between the bridge circuit 13a of the inverter 13 and the positive side terminal of the battery 12.

The overcurrent protective device 22 executes a predetermined overcurrent protective operation according to the direct current side current Idc detected by the direct current side current sensor 31.

The phase current estimation unit 23 estimates the phase current Iu, Iv, and Iw that are actually supplied from the inverter 13 to the motor 11. The phase current estimation unit 23 makes this estimation according to a direct current side current Idc detected by the direct current side current sensor 31 at a timing according to the gate signal (in other words, the PWM signal) outputted by the PWM signal generation unit 25. The operation executed by this phase current estimation unit 23 is later described in detail.

Figure 4:
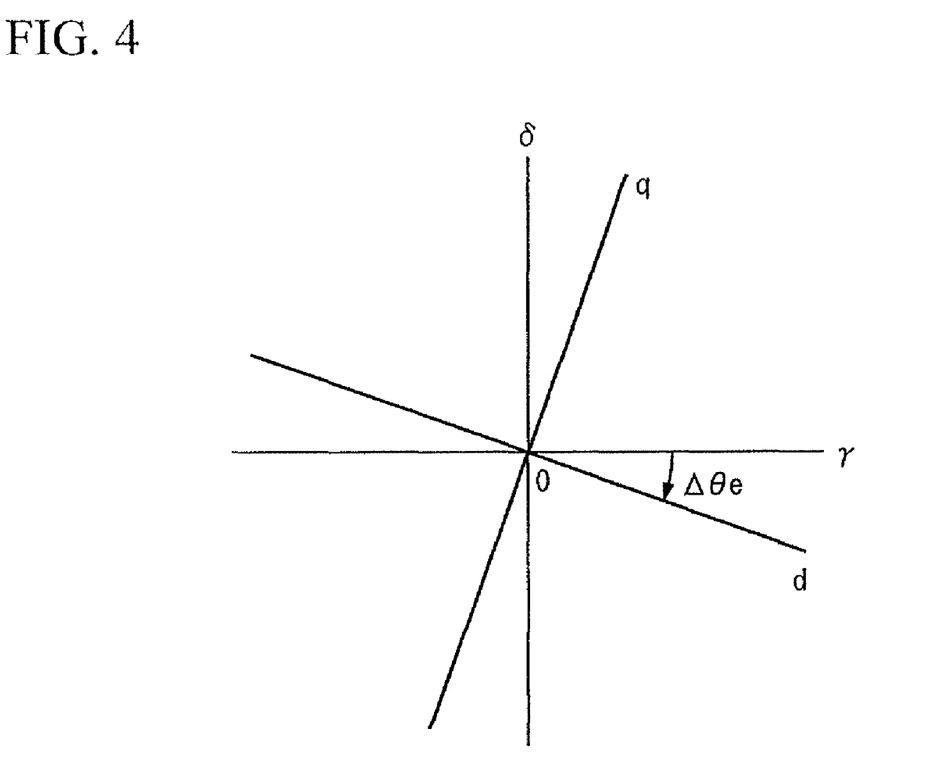
FIG. 4 is a diagram representing an example of a γ-δ axis and a d-q axis of a rotational orthogonal coordinate according to an embodiment of the present invention.

The control device 24 sets up a γ-δ axis, which is a rotational orthogonal coordinate system, as shown in FIG. 4 for example, having a phase difference of Δθe and a rotational velocity of ωe with respect to the d-q axis of the rotational orthogonal coordinate system of the actual motor 11. The phase difference Δθe is the difference between the actual rotational angle and the estimated or assigned rotational angle. Thus, the control device 24 performs a feedback control (a vector control) of the current on this γ-δ coordinate system.

The control device 24 generates a command γ-axis current Iγc and a command δ-axis current Iδc. The control device 24 then computes each of the phase voltage commands Vu, Vv, and Vw based on the command γ-axis current Iγc and the command δ-axis current Iδc, and outputs the computed Vu, Vv, and Vw to the PWM signal generation unit 25.

In addition, the control device 24 performs a current feedback control (a vector control) so that the deviation between the γ-axis current Iγ and the command γ-axis current Iγc, and the deviation between the δ-axis current Iδ and the command δ-axis current Iδc equal zero. The γ-axis current Iγ and the δ-axis current Iδ are obtained by converting each of the phase current Iu, Iv, and Iw, which are outputted by the phase current estimation unit 23, to the γδ-coordinate system.

Incidentally, the operation performed by this control device 24 is described later in detail.

The PWM signal generation unit 25 generates a gate signal (in other words, a PWM signal) that turns each of the transistors UH, VH, WH, UL, VL, and WL of the inverter 13 on and off, by comparing each of the phase voltage commands Vu, Vv, and Vw with carrier signals such as a triangular wave, in order to supply a current in a sine-wave form to a three-phase stator winding. Then, the PWM signal generation unit 25 converts the direct current electric power, supplied by the battery 12, to a three-phase alternate current electric power, by switching over the on (conduction) and off (interruption) condition of each of the transistors forming a pair for each of the three phases of the inverter 13. In addition, the PWM signal supplies a U-phase current Iu, a V-phase current Iv, and a W-phase current Iw to each stator winding by sequentially commutating the electric supply to each stator winding of the three-phase motor 11. The current Iu, Iv, and Iw is an alternate current.

The gate signal inputted from the PWM signal generation unit 25 to the inverter 13 becomes a PWM (Pulse Width Modulation) signal according to eight types of switching conditions S1 through S8 as shown, for example, in Table 1 below and in FIGS. 2A through 2H (in other words, basic voltage vectors V0 through V7, each of which has a phase that is different from one another by sixty degrees) according to the combination of an on/off condition of each of the transistors UH and UL, VH and VL, and WH and WL, each of which form a pair for each phase. Table 1 shows the transistors among each of the transistors of the high side and the low side that are turned on. In FIGS. 2A through 2H, the transistors that are turned on are shadowed.

In the direct current side of the bridge circuit 13a of the inverter 13, each of the phase current Iu, Iv, and Iw is generated intermittently according to each of the switching conditions S1 through S8. The direct current side current Idc detected by the direct current side current sensor 31 is equal to either one of the phase current Iu, Iv, and Iw, or either one of the phase current Iu, Iv, Iw with an opposite sign, or zero.

TABLE 1

| VOLTAGE VECTOR | U-PHASE | V-PHASE | W-PHASE | DETECTED PHASE CURRENT (Idc) |
|---|---|---|---|---|
| V0 | Low  | Low  | Low  | 0 |
| V1 | High | Low  | Low  | Iu |
| V2 | Low  | High | Low  | Iv |
| V3 | High | High | Low  | −Iw |
| V4 | Low  | Low  | High | Iw |
| V5 | High | Low  | High | −Iv |
| V6 | Low  | High | High | −Iu |
| V7 | High | High | High | 0 |

The phase current estimation unit 23 obtains two phases of phase current from among the three phases of phase current of the direct current side current Idc detected by the direct current side current sensor 31 in two predetermined sets of conditions from among the switching conditions S2 through S8 (in other words, basic voltage vectors V1 through V6, each of which has a phase that is different from one another by sixty degrees), in one cycle of a carrier signal such as a triangular wave. Based on these two phases of phase current, the phase current estimation unit 23 estimates the remaining one phase of phase current from among the three phases of the current. Then, the phase current estimation unit 23 outputs to the control device 24, each of the estimated values of the three phases of the phase current, estimated by the direct current side current Idc detected by the direct current side current sensor 31.

Figure 3:
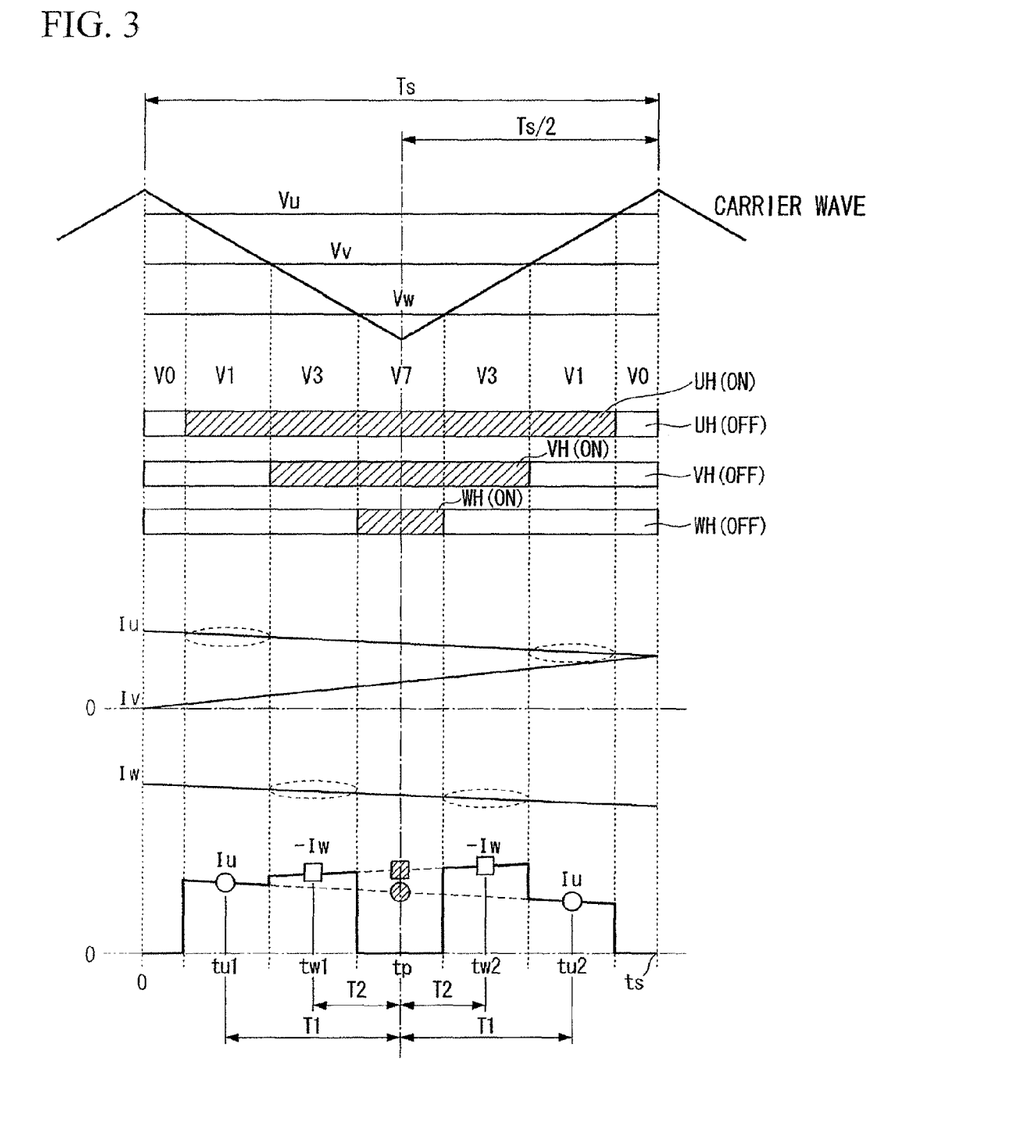
FIG. 3 is a diagram representing a carrier wave, an on/off pattern of transistors UH, UL, VH, VL, WH, and WL, and an example of a timing at which each phase current is detected according to an embodiment of the present invention.

As shown in FIG. 3, for example, during the three-phase modulation using the carrier signal of a triangular form, it is possible to obtain the detected value of two phases of the phase current twice during one cycle Ts of the carrier signal of the voltage pattern which is symmetrical with respect to the peak (carrier peak) of the valley side of the carrier signal of the triangular wave (carrier wave).

In other words, in two conditions of the basic voltage vectors V1 that are symmetrical with respect to the carrier peak, the phase current estimation unit 23 obtains the first U-phase current Iu1 and the second U-phase current Iu2 from the direct current side current Idc detected by the direct current side current sensor 31 at times tu1 and tu2 which are symmetrical with respect to the carrier peak (in other words, the times tu1 and tu2 differ from the time tp of the carrier peak of the valley side by a same time interval T1). Furthermore, in two conditions of the basic voltage vectors V3 that are symmetrical with respect to the carrier peak, the phase current estimation unit 23 obtains the first W-phase current Iw1 and the second W-phase current Iw2 from the direct current side current Idc detected by the direct current side current sensor 31 at times tw1 and tw2 which are symmetrical with respect to the carrier peak (in other words, the times tw1 and tw2 differ from the time tp of the carrier peak of the valley side by a same time interval T2).

Next, the phase current estimation unit 23 computes an average value for each phase based on each phase current Iu1, Iu2, Iw1, and Iw2. The phase current estimation 23 then sets each of the average values as the value of the current at time tp at the carrier peak in the valley side.

Then, using the fact that the total sum of the current values of each phase current at the timing equals zero, the phase current estimation unit 23 computes the current value of the remaining one phase of the phase current (for example, the V-phase current) from the current values (in other words, the current value at time tp at the carrier peak at the valley side) of the two phases of the phase current (for example, the U-phase current and the W-phase current).

Incidentally, according to the above embodiment, the phase current estimation unit 23 computed an average value based on each of the phase current Iu1, Iu2, Iw1, and Iw2, and estimated the phase current of the remaining one phase from two phases of the phase current. However, the present invention is not limited to this configuration. The phase current estimation unit 23 may estimate each phase current using other estimation methods.

Figure 5:
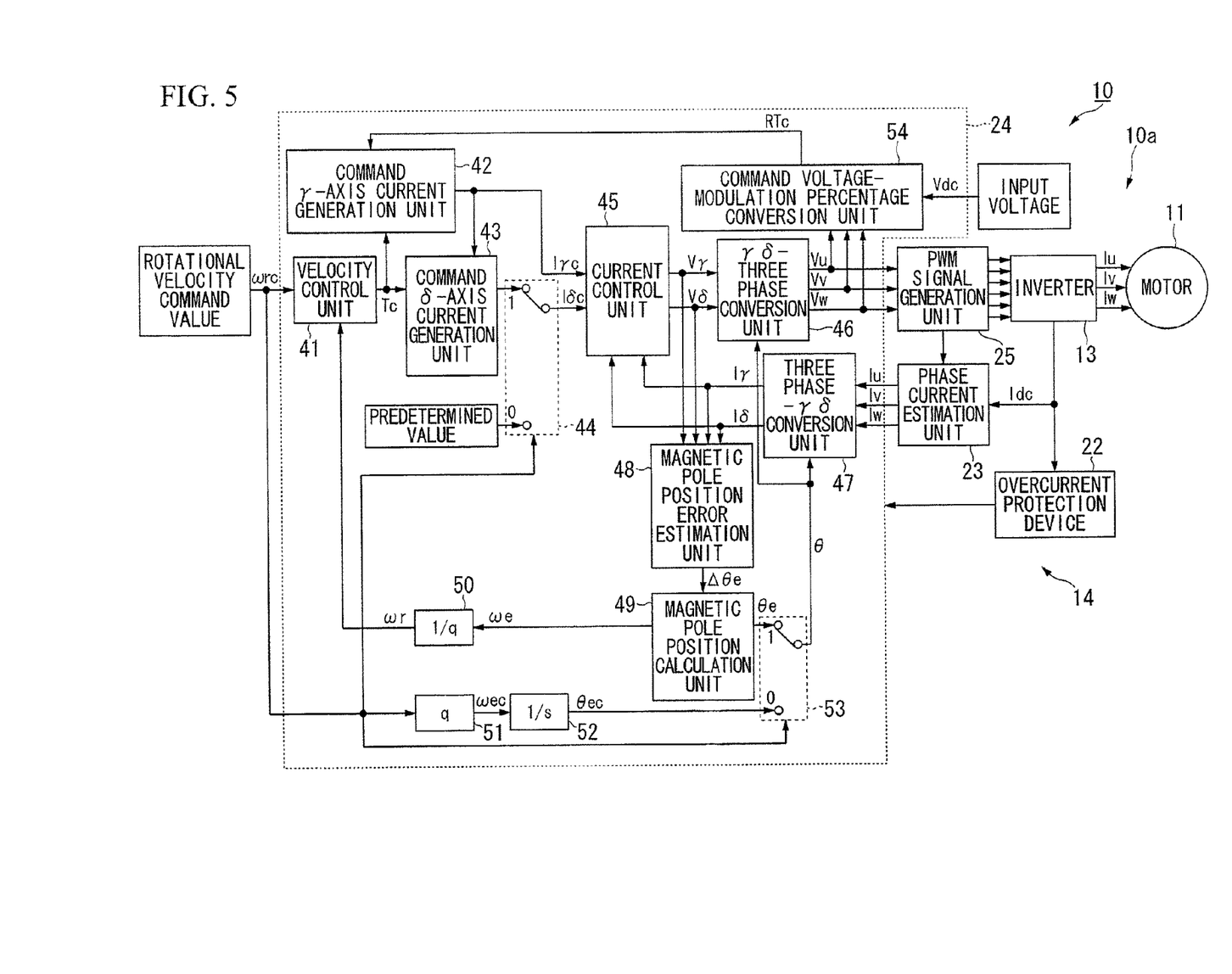
FIG. 5 is a configuration diagram of a phase current estimation device of a motor and a magnetic pole position estimation device of a motor according to an embodiment of the present invention.

The control device 24 includes, as shown in FIG. 5 for example, a velocity control unit 41, a command γ-axis current generation unit 42, a command δ-axis current generation unit 43, a first control switchover unit 44, a current control unit 45, a γδ-three-phase conversion unit 46, a three-phase-γδ conversion unit 47, a magnetic pole position error estimation unit 48, a magnetic pole position calculation unit 49, an electric angle-mechanical angle conversion unit 50, a mechanical angle-electric angle conversion unit 51, an integrator 52, a second control switchover unit 53, and a command voltage-modulation factor conversion unit 54.

The velocity control unit 41 calculates the torque command Tc based on the rotational velocity command value ωrc inputted externally, by performing, for example, an open loop control while a startup control is carried out, or by performing, for example, a close loop control according to a rotational velocity ωr (mechanical angle) outputted from the electric angle-mechanical angle conversion unit 50 while a self control is carried out. In addition, the velocity control unit 41 outputs a torque command Tc.

By the way, the control device 24 may include a torque control unit instead of this velocity control unit 41, and may perform a torque control.

Figure 6:
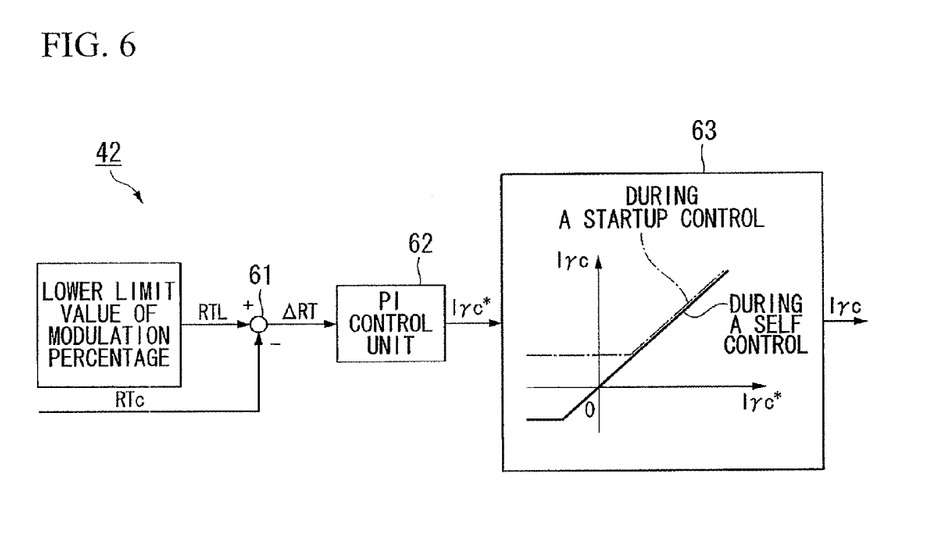
FIG. 6 is a configuration diagram of a command γ-axis current generation unit shown in FIG. 5.

The command γ-axis current generation unit 42, as shown in FIG. 6 for example, includes a modulation factor deviation calculation unit 61, a PI control unit 62, and a command γ-axis current calculation unit 63. In particular, the command γ-axis current generation unit 42 generates a command γ-axis current Iγc while a startup control is performed.

The modulation factor deviation calculation unit 61 outputs a modulation factor deviation ΔRT, which is obtained by subtracting a modulation factor RTc outputted by the command voltage-modulation factor conversion unit 54, from a predetermined lower limit value RTL of the modulation factor.

By the way, the predetermined lower limit value RTL of the modulation factor is a lower limit value of the modulation factor of the inverter 13 that makes it possible to obtain a predetermined pulse width (in other words, the pulse width of the pulse width modulation) that is necessary for the direct current side current sensor 31 to appropriately detect the direct current side current Idc of the inverter 13.

The PI control unit 62 performs a PI (proportional-integral) control so that the modulation factor deviation ΔRT equals zero. This PI control unit 62 outputs a command γ-axis current control value Iγc* obtained by controlling and amplifying the modulation factor deviation ΔRT. Thus, the value of the command γ-axis current control value Iγc* becomes larger as the modulation factor RTc of the inverter 13 becomes smaller than the predetermined lower limit value RTL of the modulation factor.

The command γ-axis current calculation unit 63 calculates the command γ-axis current Iγc by, for example, searching a predetermined map representing a correspondence relationship between the command γ-axis current control value Iγc* and the command γ-axis current Iγc. Thus, the command γ-axis current calculation unit 63 outputs the command γ-axis current Iγc.

According to the predetermined map showing the correspondence relationship between the command γ-axis current control value Iγc* and the command γ-axis current Iγc, as shown in FIG. 6 for example, the command γ-axis current Iγc is set to be a constant, predetermined lower limit value when the value of the command γ-axis current control value Iγc* runs from zero to a predetermined value. In addition, the command γ-axis current Iγc is set to have a tendency to increase from the predetermined lower limit value as the command γ-axis current control value Iγc* increases from the predetermined value. Furthermore, while a startup control is performed, the predetermined lower limit value of the command γ-axis current Iγc is set according to the load of the motor 11. On the other hand, while a self control is performed, the predetermined lower limit value is set either to zero or a predetermined value according to the type of the motor 11. For example, in the case of an IPM (Interior Permanent Magnet) motor, a reluctance torque may be considered by setting a negative value as the predetermined value.

The command γ-axis current generation unit 42 may generate a command γ-axis current Iγc by using a method other than a PI (proportional-integral) control.

Figure 7:
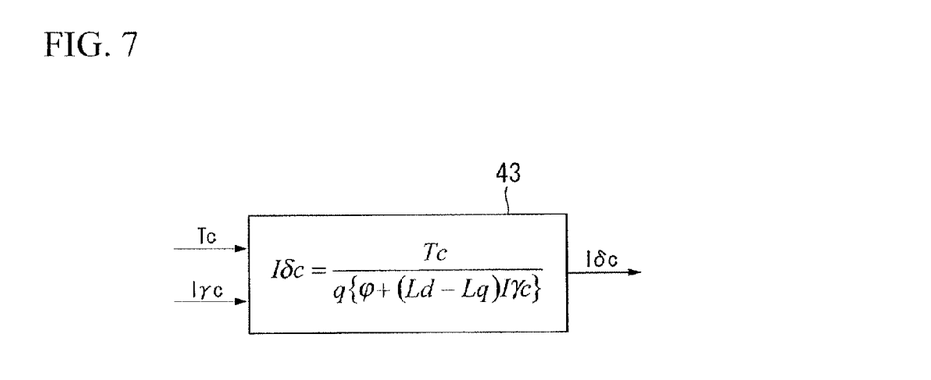
FIG. 7 is a configuration diagram of a command δ-axis current generation unit shown in FIG. 5.

The command δ-axis current generation unit 43 calculates the command δ-axis current Iδc, based on the torque command Tc, the pair of poles of the motor q, a magnetic flux component φ of the permanent magnet, the d-axis inductance Ld, the q-axis inductance Lq, and the command γ-axis current Iγc, as shown in FIG. 7 and in Formula 1, for example. The command δ-axis current generation unit 43 then outputs the command δ-axis current Iδc.

$$I\delta c = \frac{Tc}{q\{\varphi + (Ld - Lq)I\gamma c\}} \quad \text{(Formula 1)}$$

The first control switchover unit 44 includes a switch (SW), for example. Based on the rotational velocity command value ωrc inputted from outside, the first control switchover unit 44 selects either one of the command δ-axis current Iδc outputted by the command δ-axis current generation unit 43, or a predetermined value (such as zero). Then, the first control switchover unit 44 outputs the selected value as the command δ-axis current Iδc.

Figure 8:
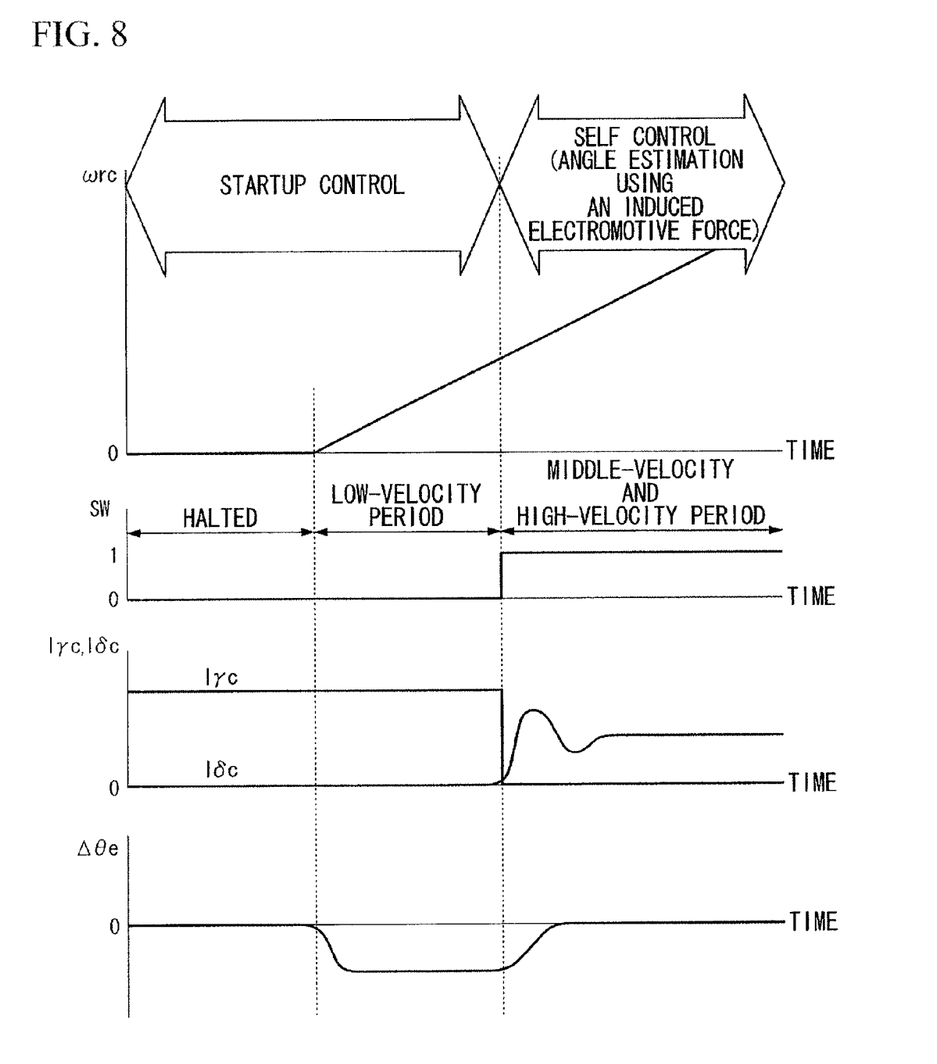
FIG. 8 is a diagram representing an example of a change in a rotational velocity command value ωrc, a command γ-axis current Iγc, a command δ-axis current Iδc, and a phase difference Δθe based on a control mode of a motor according to an embodiment of the present invention.

During a halting period or during a low-velocity period when the rotational velocity command value core is less than a predetermined rotational velocity, the first control switchover unit 44 sets the control mode of the motor 11 to a startup control, as shown in FIG. 8, for example. The first control switchover unit 44 then selects a predetermined value (such as zero), and outputs this predetermined value as the command δ-axis current Iδc.

On the other hand, during a middle-velocity period or a high-velocity period when the rotational velocity command value ωrc is greater than or equal to a predetermined rotational velocity, the first control switchover unit 44 sets the control mode of the motor 11 to a self control. The first control switchover unit 44 then selects the control δ-axis current Iδc outputted by the command δ-axis current generation unit 43. The first control switchover unit 44 then outputs this selected value as the command δ-axis current Iδc.

The current control unit 45 calculates the deviation ΔIγ between the command γ-axis current Iγc outputted by the command γ-axis current generation unit 42 and the γ-axis current Iγ outputted by the three-phase-γδ conversion unit 47. In addition, the current control unit 45 calculates the deviation ΔIδ between the command δ-axis current Iδc outputted by the first control switchover unit 44 and the δ-axis current Iδ outputted by the three-phase-γδ conversion unit 47. Then, the current control unit 45 calculates the γ-axis voltage command value Vγ by controlling and amplifying the deviation ΔIγ, and calculates the δ-axis voltage command value Vδ by controlling and amplifying the deviation ΔIδ, through a PI (proportional-integral) control, for example. Then, the current control unit 45 outputs the γ-axis voltage command value Vγ and the δ-axis voltage command value Vδ.

The γδ-three-phase conversion unit 46 converts the γ-axis voltage command value Vγ and the δ-axis voltage command value Vδ in a γ-δ coordinate system to a U-phase voltage command Vu, a V-phase voltage command Vv, and a W-phase voltage command Vw, according to the magnetic pole estimation value θ of the motor 11 outputted by the second control switchover unit 53. The U-phase voltage command Vu, the V-phase voltage command Vv, and the W-phase voltage command Vw are voltage command values in a three-phase alternate current coordinate system which is a coordinate system at rest.

The three-phase-γδ conversion unit 47 converts the estimation values of each phase current Iu, Iv, and Iw outputted by the phase current estimation unit 23, to a γ-axis current Iγ and a δ-axis current Iδ in a γ-δ coordinate system. The three-phase-γδ conversion unit 47 performs this conversion according to the magnetic pole estimation value θ of the motor 11 outputted by the second control switchover unit 53.

The magnetic pole position error estimation unit 48 estimates the phase difference Δθe based on the γ-axis voltage command value Vγ and the δ-axis voltage command value Vδ outputted by the current control unit 45 and the γ-axis current Iγ and the δ-axis current Iδ outputted by the three-phase-γδ conversion unit 47, for example. The magnetic pole position error estimation unit 48 carries out this estimation using the fact that the induced electromotive force generated during the rotation of the motor 11 changes because of the rotational velocity.

The magnetic pole position calculation unit 49 calculates the phase difference Δθe. The magnetic pole position calculation unit 49 also calculates the deviation of the target conversion value of this phase difference Δθe, which is zero (Δθe=0). The magnetic pole position calculation unit 49 performs a PI control so that this deviation equals zero. The magnetic pole position calculation unit also calculates the rotational velocity estimation value we of the motor 11. Furthermore, the magnetic pole position calculation unit 49 integrates the rotational velocity estimation value ωe, and calculates the magnetic pole position estimation value θe. Then, the magnetic pole position calculation unit 49 outputs the magnetic pole position estimation value θe and the rotational velocity estimation value ωe.

The electric angle-mechanical angle conversion unit 50 converts the rotational velocity estimation value ωe outputted by the magnetic pole position calculation unit 49 to a rotational velocity ωr (mechanical angle) according to the pair of poles q of the motor 11. The electric angle-mechanical angle conversion unit 50 then outputs the rotational velocity ωr (mechanical angle).

The mechanical angle-electric angle conversion unit 51 converts the rotational velocity command value ωrc inputted from outside to the rotational velocity command value ωec (electric angle) according to the pair of poles q of the motor 11. The mechanical angle-electric angle conversion unit 51 then outputs the rotational velocity command value ωec (electric angle).

The integrator 52 integrates the rotational velocity command value wee (electric angle) outputted by the mechanical angle-electric angle conversion unit 51, and computes the magnetic pole position command value θec. Then, the integrator 52 outputs this magnetic pole position command value θec.

The second control switchover unit 53 includes a switch (SW), for example. Based on the rotational velocity command value ωrc inputted from outside, the second control switchover unit 53 selects either one of the magnetic pole position estimation value θe outputted by the magnetic pole position calculation unit 49 or the magnetic pole position command value θec outputted by the integrator 52. Then, the second control switchover unit 53 outputs the selected value as the magnetic pole position estimation value θ.

During a halting period or during a low-velocity period when the rotational velocity command value ωrc is less than a predetermined rotational velocity, the second control switchover unit 53 sets the control mode of the motor to a startup control, as shown in FIG. 8, for example. The second control switchover unit 53 then selects the magnetic pole position command value θec, outputted by the integrator 52, and outputs this selected value as the magnetic pole position estimation value θ. On the other hand, during a middle-velocity period or a high-velocity period when the rotational velocity command value ωrc is greater than or equal to a predetermined rotational velocity, the second control switchover unit 53 sets the control mode of the motor 11 to a self control. The second control switchover unit 53 then selects the magnetic pole position estimation value θe outputted by the magnetic pole position calculation unit 49. The second control switchover unit 53 then outputs this selected value as the magnetic pole position estimation value θ.

The command voltage-modulation factor conversion unit 54 calculates the modulation factor RTc of the inverter 13 according to each phase voltage command Vu, Vv, and Vw outputted by the γδ-three-phase conversion unit 46, and the input voltage Vdc of the inverter 13 (in other words, the direct current voltage applied to the inverter by the battery, for example). The command voltage-modulation factor conversion unit 54 then outputs the modulation factor RTc.

The command voltage-modulation factor conversion unit 54 may calculate the modulation factor RTc of the inverter 13 according to the γ-axis voltage command value Vγ and the δ-axis voltage command value Vδ outputted by the current control unit 45, and the input voltage Vdc of the inverter 13.

The phase current estimation device 10a of the motor and the magnetic pole position estimation device 10 of the motor according to the present embodiment are configured as described above. Next, an operation of the phase current estimation device 10a and the magnetic pole position estimation device 10 is described. In particular, an operation according to the control mode of the motor 11 is described.

During a halting period and a low-velocity period in which the rotational velocity command value ωrc is less than a predetermined rotational velocity ωrlow, the motor control device 14 performs a startup control of the motor 11.

First, when the motor 11 is halted, the command γ-axis current generation unit 42 outputs a command γ-axis current Iγc, which is a positive value, so that the load of the motor with respect to the rotational drive is exceeded. This command γ-axis current Iγc is set to be greater than or equal to a lower limit command γ-axis current, which enables the motor 11 to be rotated and driven with a predetermined stability. At the same time, the modulation factor of the inverter 13 is set to be greater than or equal to a predetermined lower limit value RTL of the modulation factor. This predetermined lower limit value RTL of the modulation factor is a value such that a predetermined pulse length (in other words, a pulse length of a pulse width modulation) can be obtained so that the direct current side current Idc of the inverter 13 can be appropriately detected by the direct current side current sensor 31. At the same time, the predetermined lower limit value RTL of the modulation factor is a value such that there is a predetermined amount of margin with respect to an overshoot or an undershoot according to a PI control gain which is generated on the command γ-axis current control value Iγc* outputted by the PI control unit 62 of the command γ-axis current generation unit 42.

The magnetic pole position of the motor 11 is fixed by an voltage applied according to the γ-axis voltage command value Vγ outputted by the current control unit 45. The voltage value under this condition is the initial value of the integrator of the current control unit 45, when the modulation factor of the inverter 13 is greater than or equal to a predetermined lower limit value RTL of the modulation factor. As a result, the direct current side current Idc of the inverter 13 can be detected appropriately by the direct current side sensor 31. In addition, the three-phase current can be estimated appropriately according to a detection signal outputted by the direct current side sensor 31. Thus, a feedback control of the current can be executed appropriately according to the estimation value of the three-phase current outputted by the phase current estimation unit 23.

During a low-velocity period of the motor 11, an open-loop control is executed based on the rotational velocity command value ωrc inputted from outside.

At this time, as the rotational velocity command value ωrc increases, each phase voltage command Vu, Vv, and Vw (or the γ-axis voltage command value Vγ and the δ-axis voltage command value Vδ) increases, and the modulation factor RTc of the inverter 13 increases as well. Accordingly, the command γ-axis current Iγc outputted by the command γ-axis current generation unit 42 tends to decrease so that the command γ-axis current Iγc is greater than or equal to the lower limit of the command γ-axis current Iγc.

When a self control is performed on the motor 11, a close-loop control is executed according to the rotational velocity command value core inputted from outside, and according to the rotational velocity ωr (mechanical angle) outputted by the electric angle-mechanical angle conversion unit 50.

At this time, as the rotational velocity command value core increases, each phase voltage command Vu, Vv, and Vw (or the γ-axis voltage command value Vγ and the δ-axis voltage command value Vδ) increases, and the modulation factor RTc of the inverter 13 increases as well. Accordingly, the command γ-axis current Iγc, outputted by the command γ-axis current generation unit 42, tends to decrease. This command γ-axis current Iγc is set either to zero as a predetermined lower limit of the command γ-axis current or to a predetermined value corresponding to the type of the motor 11. For example, in the case of an IPM (Interior Permanent Magnet) motor, a reluctance torque can be considered by setting a negative value as the predetermined value. In this case, the command δ-axis current Iδc can be calculated so as to restrain the torque fluctuation of the motor 11.

In addition, the command δ-axis current Iδc is calculated based on Formula 1. For example, in the case of an SPM (Surface Permanent Magnet) motor, the d-axis inductance Ld and the q-axis inductance Lq is equal (Ld≠Lq). Therefore, even if the command γ-axis current Iγc is changed, the command δ-axis current Iδc does not change.

Figure 9:
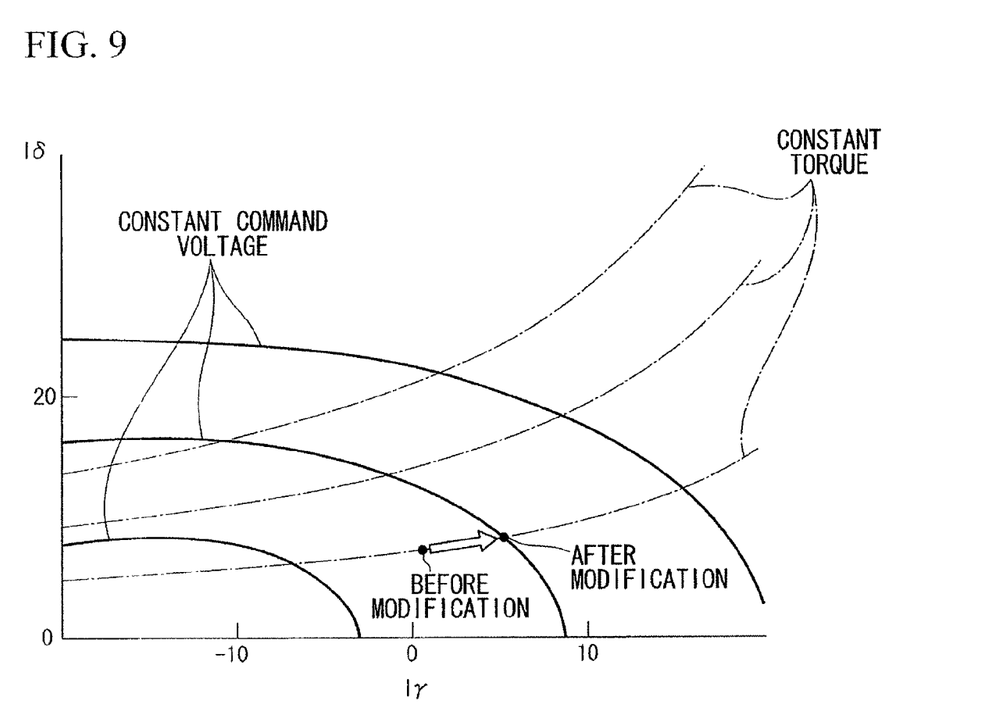
FIG. 9 is a diagram representing an example of a change in a current operation point before and after a modification of a modulation factor of an inverter (in other words, a PI control by a command γ-axis current generation unit based on a predetermined lower limit value RTL of a modulation factor) according to an embodiment of the present invention.

On the other hand, in the case of an IPM (Interior Permanent Magnet) motor, for example, the d-axis inductance Ld is not equal to the q-axis inductance Lq (Ld≠Lq). Thus, according to a change in the command γ-axis current Iγc, the command δ-axis current Iδc changes as well. At this time, the torque command Tc is maintained to be constant, as shown in FIG. 9 before and after the correction (in other words, the PI control performed by the command γ-axis current generation unit 42 based on the predetermined lower limit value RTL of the modulation factor) of the modulation factor of the inverter 13.

When the rotational velocity command value ωrc becomes greater than or equal to a predetermined rotational velocity ωrlow in a middle-velocity range and/or in the high-velocity range, the startup control ceases to be performed, and a self control begins to be executed.

As described above, based on the phase current estimation device 10a of the motor according to the above aspect of the present invention, the deviation ΔIγ between a command γ-axis current Iγc and the γ-axis current Iγ is computed. In addition, the deviation ΔIδ between a command δ-axis current Iδc and the δ-axis current Iδ is computed. The command γ-axis current Iγc and the command δ-axis current Iδc are based on the modulation factor deviation ΔRT between a predetermined lower limit value RTL of the modulation factor and a modulation factor RTc of the inverter 13. The predetermined lower limit value RTL of the modulation factor sets the range of the modulation factor in which the phase current can be estimated. A feedback control is performed on the current so that each of the deviations ΔIγ and ΔIδ equal zero. Therefore, it is possible to obtain a predetermined pulse width (in other words, a pulse width of a pulse width modulation) necessary to appropriately detect the direct current side current Idc when the phase current is estimated from the direct current side current Idc of the inverter 13. Even when the rotational velocity of the motor 11 is small, for example, the accuracy of estimating the phase current can be improved appropriately without relying on the generation of or the application of harmonic voltage. At the same time, it is possible to avoid an increase in noise and torque pulsation resulting from harmonic voltage. Moreover, it is possible to prevent a decline in the stability with which current is controlled.

In particular, when a startup control is performed on the motor 11, a feedback control is executed on the current so that the deviation between the γ-axis current Iγ and the command γ-axis current Iγc, according to the modulation factor deviation ΔRT, equals zero. As a result, it is possible to restrain the influence from the setting error of the electric circuit constant of the motor 11. In addition, during the period in which the rotational velocity command value ωrc of the motor 11 reaches a predetermined rotational velocity ωrlow such that a self control can be performed, it is possible to prevent the modulation factor RTc of the inverter 13 from falling below the predetermined lower limit value RTL of the modulation factor. In this way, it is possible to retain a predetermined pulse width (in other words, a pulse width of the pulse width modulation) that is necessary to appropriately detect a direct current side current Idc when the phase current is estimated from the direct current side current Idc of the inverter 13. At the same time, it is possible to enhance the level of precision with which the phase current is estimated.

Since the current is controlled based on the modulation factor RTc of the inverter 13, the stability of the control can be maintained even if the input voltage of the inverter 13 fluctuates, for example.

Furthermore, based on the magnetic pole position estimation device 10 of the motor according to the above embodiment of the present invention, the magnetic pole position can be estimated appropriately based on the induced electromotive force, in addition to estimating the phase current.

Furthermore, since the modulation factor RTc of the inverter 13 is maintained to be greater than or equal to a predetermined lower limit value RTL of the modulation factor, it is possible to reduce the error triggered by a deadtime. It is also possible to reduce the error resulting from the on-voltage generated by the on-resistance of each transistor. Therefore, a good estimation of the magnetic pole position can be obtained even in a low-velocity period of the motor 11.

According to the present embodiment described above, the phase current estimation unit 23 computes an average value for each phase from a detected value of two phases of phase current during a period of one cycle Ts of a carrier signal, considering a three-phase modulation using a carrier signal in triangular waveform. Here, each average value was considered to be a current value at a time Ts/2 at the carrier peak in the valley side. However, the present invention is not limited to this configuration. For example, considering a two-phase modulation, an average value can be computed for each phase from the detected value of two phases of phase current during a period of one cycle Ts of the carrier signal. Each average value can be considered a current value at time Ts/2 at the carrier peak of the valley side. Meanwhile, according to the above embodiment of the present invention, the phase current estimation unit 23 computes an average value for each phase from the detected value of two phases of phase current. The phase current estimation unit 23 then estimated the other single phase of the phase current from two phases of the phase current. However, the present invention is not limited this configuration. Each phase current can be estimated using a different method.

In addition, according to the above embodiment of the present invention, a feedback control of the current was performed based on the command γ-axis current Iγc according to a modulation factor deviation ΔRT during a startup control. However, the present invention is not limited to this configuration. A feedback control of the current can be executed based on the command δ-axis current Iδc according to the modulation factor deviation ΔRT. In this case, when the motor 11 has been halted, an voltage is applied according to the δ-axis voltage command value Vδ outputted by the current control unit 45.

Furthermore, according to the above embodiment of the present invention, the control device 24 performs a feedback control (a vector control) of the current in a γ-δ coordinate system according to the modulation factor deviation ΔRT. However, the present invention is not limited to this configuration. A feedback control of the voltage can be performed according to the modulation factor deviation ΔRT.

Thus, while a preferred embodiment of the present invention has been described above, it should be understood that these are exemplary of the invention and are not to be considered as limiting the present invention. Additions, omissions, substitutions, and other modifications can be made without departing from the spirit or scope of the present invention. The invention is not to be considered as being limited by the foregoing description, and is only limited by the scope of the appended claims.

What is claimed is:

1. A phase current estimation device of a motor, the phase current estimation device comprising:

an inverter which uses a pulse width modulation signal to sequentially commutate an electric flow to a motor of a three-phase alternating current;

a pulse width modulation signal generation unit generating the pulse width modulation signal from a carrier signal;

a control unit performing a startup control and a self control of the motor using the inverter;

a direct current sensor detecting a direct current of the inverter; and a phase current estimation unit estimating a phase current based on the direct current detected by the direct current sensor, wherein the control unit performs a feedback control while the startup control and the self control are performed, so that a first deviation between a control command value and a control detection value corresponding to the control command value equals zero, the control command value being based on a second deviation between a modulation factor of the inverter and a predetermined modulation factor lower limit value, the predetermined modulation factor lower limit value being a lower limit of a modulation factor range in which the phase current estimation unit is capable of estimating the phase current.

2. A phase current estimation device of a motor according to claim 1, wherein the control unit sets up a γδ-coordinate system having a phase difference with respect to a γδ-coordinate system, the control unit performing a feedback control of a current while the startup control is executed, so that a third deviation between a γ-axis current command value as the control command value and a γ-axis current detection value as the control detection value equals zero.

3. A magnetic pole position estimation device of a motor, the magnetic pole position estimation device comprising:
   the phase current estimation device of the motor described in claim 1; and
   a rotational angle estimation unit estimating a rotational angle of the motor while the self control is executed, and outputting an estimated rotational angle signal.

4. A magnetic pole position estimation device of a motor, the magnetic pole position estimation device comprising:
   the phase current estimation device of the motor described in claim 2; and
   a rotational angle estimation unit estimating a rotational angle of the motor while the self control is executed, and outputting an estimated rotational angle signal.

* * * * *